US008258672B2

(12) United States Patent
Walitzki

(10) Patent No.: US 8,258,672 B2
(45) Date of Patent: Sep. 4, 2012

(54) COMPOSITE STRUCTURE GAP-DIODE THERMOPOWER GENERATOR OR HEAT PUMP

(75) Inventor: Hans Juergen Walitzki, Portland, OR (US)

(73) Assignee: Borealis Technical Limited (GI)

( * ) Notice: Subject to any disclaimer, the term of this patent is extended or adjusted under 35 U.S.C. 154(b) by 349 days.

(21) Appl. No.: 12/284,771

(22) Filed: Sep. 24, 2008

(65) Prior Publication Data

US 2009/0127549 A1 May 21, 2009

Related U.S. Application Data

(60) Provisional application No. 60/994,999, filed on Sep. 24, 2007.

(51) Int. Cl.
*H02N 10/00* (2006.01)

(52) U.S. Cl. .......... 310/306; 62/3.7

(58) Field of Classification Search .......... 310/306; 257/43; 62/3.7
See application file for complete search history.

(56) References Cited

U.S. PATENT DOCUMENTS 3,169,200 A 6/1962 Huffman
4,667,126 A * 5/1987 Fitzpatrick .......... 310/306
6,064,137 A * 5/2000 Cox .......... 310/306
6,117,344 A 9/2000 Cox et al.
6,281,514 B1 8/2001 Tavkhelidze
6,417,060 B2 7/2002 Tavkhelidze et al.
6,495,843 B1 12/2002 Tavkelidze
6,531,703 B1 3/2003 Tavkhelidze
6,680,214 B1 1/2004 Tavkhelidze et al.
6,720,704 B1 4/2004 Tavkhelidze et al.
6,774,003 B2 8/2004 Tavkhelidze et al.
6,876,123 B2 4/2005 Martinovsky et al.
7,211,891 B2 * 5/2007 Shimogishi .......... 257/717
7,589,348 B2 * 9/2009 Walitzki .......... 257/46
2004/0050415 A1 * 3/2004 Kucherov et al. .......... 136/252
2006/0006515 A1 * 1/2006 Cox .......... 257/684
2006/0038290 A1 * 2/2006 Tavkhelidze et al. .......... 257/734
2006/0138896 A1 * 6/2006 Makansi .......... 310/306
2006/0249796 A1 11/2006 Tavkhelidze et al.
2007/0013055 A1 1/2007 Walitzki
2009/0127549 A1 * 5/2009 Walitzki .......... 257/43

FOREIGN PATENT DOCUMENTS

WO 9947980 A1 9/1999
WO 03083177 A2 10/2003
WO 03090245 A1 10/2003

* cited by examiner

*Primary Examiner* — Karl Tamai

(57) ABSTRACT

A thermionic or thermotunneling generator or heat pump is disclosed, comprising electrodes substantially facing one another and separated by spacers disposed between the electrodes, wherein the substrate material for the cathode is preferably a single crystalline silicon wafer while the substrate for the anode is an organic wafer, and preferably a polished polyimide (PI) wafer. On the cathode side, standard silicon wafer processes create the 10-1000 nm thin spacers and edge seals from thermally grown oxide. Either wafer is partially covered with a thin film of material that is characterized by high electrical conductivity and low work function. In one embodiment, the cathode is partially covered with a thin film of Ag—Cs—O. In another embodiment, the anode is additionally covered with a thin film of Ag—Cs—O, in which case the work function of the cathode coating material is reduced further utilizing an Avto Metal structure of nanoscale patterned indents. A method for fabricating the composite structure device is further disclosed.

20 Claims, 1 Drawing Sheet

Sheet 1 of 5

COMPOSITE STRUCTURE GAP-DIODE THERMOPOWER GENERATOR OR HEAT PUMP

CROSS REFERENCE TO RELATED APPLICATIONS

This application claims the benefit of Provisional Application No. 60/994,999, filed 24 Sep. 2007.

BACKGROUND OF THE INVENTION

This invention relates to devices that use a thermal gradient to create electrical power and also towards devices that use electrical power or energy to pump heat, thereby creating, maintaining or degrading a thermal gradient. This present invention is specifically directed towards devices utilizing thermionic or themotunneling processes.

DEFINITIONS

"Gap diode" is defined as any diode which employs a gap between the anode and the cathode, or the collector and emitter, and which causes or allows electrons to be transported between the two electrodes, across or through the gap. The gap may or may not have a vacuum between the two electrodes, though gap diodes specifically exclude bulk liquids or bulk solids in-between the anode and cathode. The gap diode may be used for Cool Chips, Power Chips, and for other diode applications.

In what follows, the term 'Avto Metals' is to be understood as a metal film having a modified shape, which alters the electronic energy levels inside the modified electrode, leading to a decrease in electron work function as described in the foregoing, and illustrated in FIG. 1 below.

"Matching" surface features of two facing surfaces of electrodes means that where one has an indentation, the other has a protrusion and vice versa. Thus, the two surfaces are substantially equidistant from each other in operation.

In U.S. Pat. No. 6,417,060, a method for manufacturing a pair of electrodes comprises fabricating a first electrode with a substantially flat surface and placing a sacrificial layer over a surface of the first electrode, wherein the sacrificial layer comprises a first material. A second material is placed over the sacrificial layer, wherein the second material comprises a material that is suitable for use as a second electrode. The sacrificial layer is removed with an etchant, wherein the etchant chemically reacts with the first material, and further wherein a region between the first electrode and the second electrode comprises a gap that is a distance of 50 nanometers or less, preferably 5 nanometers or less. Alternatively, the sacrificial layer is removed by cooling the sandwich with liquid nitrogen, or alternatively still, the sacrificial layer is removed by heating the sacrificial layer and thereby evaporating the sacrificial layer.

In U.S. Pat. No. 6,774,003, a method for manufacturing a pair of electrodes comprises fabricating a first electrode with a substantially flat surface and placing a sacrificial layer over a surface of the first electrode, wherein the sacrificial layer comprises a first material. A second material is placed over the sacrificial layer, wherein the second material comprises a material that is suitable for use as a second electrode. The sacrificial layer is removed with an etchant, wherein the etchant chemically reacts with the first material, and further wherein a region between the first electrode and the second electrode comprises a gap that is a distance of 50 nanometers or less, preferably 5 nanometers or less. Alternatively, the sacrificial layer is removed by cooling the sandwich with liquid nitrogen, or alternatively still, the sacrificial layer is removed by heating the sacrificial layer, thereby evaporating the sacrificial layer.

A common complication occurring with thermionic gap diodes is the issue of properly maintaining the vacuum gap in the face of large temperature swings between idle and operating modes. This becomes an especially crucial issue when the temperature difference between the cathode and anode is large, such as in the range of several hundred degrees Celsius.

To operate a converter with a gap spacing of less than 10.mu.m, the electrode surface must be very flat and smooth, with no deformation larger than about 0.2.mu.m. This places a limitation on the practical size of the cathode and anode, because heat flux through the surfaces causes a differential thermal expansion from one side relative to the other, leading to thermal expansion-caused deformation into a "dome-like" shape. This issue is even more important in high power operation. There has been a need, therefore, for a thermionic generator which is easy to fabricate, inexpensive, reliable, of high efficiency, modular, compact and having an extended life.

In U.S. Pat. No. 6,720,704, diode devices are disclosed in which the separation of the electrodes is set and controlled using piezo-electric, electrostrictive or magnetostrictive actuators. This avoids problems associated with electrode spacing changing or distorting as a result of heat stress. In addition it allows the operation of these devices at electrode separations which permit quantum electron tunneling between them. Pairs of electrodes whose surfaces replicate each other are also disclosed. These may be used in constructing devices with very close electrode spacings.

In WO03090245, a gap diode is disclosed in which a tubular actuating element serves as both a housing for a pair of electrodes and as a means for controlling the separation between the electrode pair. In a preferred embodiment, the tubular actuating element is a quartz piezo-electric tube. In accordance with another embodiment of the present invention, a gap diode is disclosed which is fabricated by micromachining techniques in which the separation of the electrodes is controlled by piezo-electric, electrostrictive or magnetostrictive actuators. Preferred embodiments of gap diodes include Cool Chips, Power Chips, and photoelectric converters.

However, active elements such as piezo actuators may be complicated and costly. Thus the simplicity of a layered structure to provide separation of electrodes is desirable.

In U.S. Pat. No. 3,169,200, a multilayer converter is described which comprises two electrodes, intermediate elements and oxide spacers disposed between each adjacent element. A thermal gradient is maintained across the device and opposite faces on each of the elements serve as emitter and collector. Electrons tunnel through each oxide barrier to a cooler collector, thereby generating a current flow through a load connected to the two electrodes. One drawback is that the device must contain some 10exp6 elements in order to provide reasonable efficiency, and this is difficult to manufacture. A further drawback results from the losses due to thermal conduction: although the oxide spacers have a small contact coefficient with the emitter and collector elements, which minimizes thermal conduction, the number of elements required for the operation of the device means that thermal conduction is not insignificant.

In U.S. Pat. No. 6,876,123, a thermotunneling converter is disclosed comprising a pair of electrodes having inner surfaces substantially facing one another, and a spacer or plurality of spacers positioned between the two electrodes, having a height substantially equal to the distance between the electrodes, and having a total cross-sectional area that is less than the cross-sectional area of either of the electrodes. In a preferred embodiment, a vacuum is introduced, and in a particularly preferred embodiment, gold that has been exposed to cesium vapor is used as one or both of the electrodes. In a further embodiment, the spacer is made of small particles disposed between the electrodes. In a yet further embodiment, a sandwich is made containing the electrodes with an unoxidized spacer. The sandwich is separated and the spacer is oxidized, which makes it grow to a required height whilst giving it insulatory properties, to allow for tunneling between the electrodes.

The abovementioned highlights a further issue that arises with gap diodes, namely parasitic heat loss. Although a vacuum gap by itself is a perfect insulator, heat may flow from the hot side to the cold side through the spacers and the edge seals. Even if a material with low thermal conductivity is chosen for spacers and edge seals, the heat losses can be substantial if the substrates are chosen from a metal or semiconductor material due to the fact that the spacers and seals are very thin.

Avto Metals:

In U.S. Pat. Nos. 6,281,514, 6,531,703 and 6,495,843 and WO9940628, a method is disclosed for promoting the passage of elementary particles at or through a potential barrier comprising providing a potential barrier having a geometrical shape for causing de Broglie interference between the elementary particles. In another embodiment, the invention provides an elementary particle-emitting surface having a series of indents. The depth of the indents is chosen so that the probability wave of the elementary particle reflected from the bottom of the indent interferes destructively with the probability wave of the elementary particle reflected from the surface. This results in the increase of tunneling through the potential barrier. When the elementary particle is an electron, electrons tunnel through the potential barrier, thereby leading to a reduction in the effective work function of the surface. In further embodiments, the invention provides vacuum diode devices, including a vacuum diode heat pump, a thermionic converter and a photoelectric converter, in which either or both of the electrodes in these devices utilize said elementary particle-emitting surface. In yet further embodiments, the invention provides devices in which the separation of the surfaces in such devices is controlled by piezo-electric positioning elements. A further embodiment provides a method for making an elementary particle-emitting surface having a series of indents.

In U.S. Pat. No. 6,117,344 and WO9947980, methods are described for fabricating nano-structured surfaces having geometries in which the passage of elementary particles through a potential barrier is enhanced. The methods use combinations of electron beam lithography, lift-off, and rolling, imprinting or stamping processes.

In U.S. Pat. No. 6,680,214, a method is disclosed for the induction of a suitable band gap and electron emissive properties into a substance, in which the substrate is provided with a surface structure corresponding to the interference of electron waves. Lithographic or similar techniques are used, either directly onto a metal mounted on the substrate, or onto a mold which then is used to impress the metal. In a preferred embodiment, a trench or series of nano-sized trenches are formed in the metal.

In WO03/083177, the use of electrodes having a modified shape and a method of etching a patterned indent onto the surface of a modified electrode, which modifies the electronic energy levels inside the modified electrode, leading to a decrease in electron work function is disclosed. The method comprises creating an indented or protruded structure on the surface of a metal. The depth of the indents or height of protrusions is equal to a, and the thickness of the metal is Lx+a. The minimum value for a is chosen to be greater than the surface roughness of the metal. Preferably the value of a is chosen to be equal to or less than Lx/5. The width of the indentations or protrusions is chosen to be at least 2 times the value of a. Typically the depth of the indents is >λ/2, wherein λ is the de Broglie wavelength, and the depth is greater than the surface roughness of the metal surface. Typically the width of the indents is >>λ, wherein λ is the de Broglie wavelength. Typically the thickness of the indents is a multiple of the depth, preferably between 5 and 15 times said depth, and preferably in the range 15 to 75 nm. FIG. 1 shows the shape and dimensions of a modified electrode having a thin metal film 40 on a substrate 42. Indent 44 has a width b and a depth a relative to the height of metal film 40. Film 40 comprises a metal whose surface should be as planar as possible as surface roughness leads to the scattering of de Broglie waves. Metal film 40 is given sharply defined geometric patterns or indent 44 of a dimension that creates a de Broglie wave interference pattern that leads to a decrease in the electron work function, thus facilitating the emissions of electrons from the surface and promoting the transfer of elementary particles across a potential barrier. The surface configuration of the modified electrode may resemble a corrugated pattern of squared-off, "u"-shaped ridges and/or valleys. Alternatively, the pattern may be a regular pattern of rectangular "plateaus" or "holes," where the pattern resembles a checkerboard. The walls of indent 44 should be substantially perpendicular to one another, and its edges should be substantially sharp. The surface configuration comprises a substantially planar slab of a material having on one surface one or more indents of a depth approximately 5 to 20 times a roughness of said surface and a width approximately 5 to 15 times said depth. The walls of the indents are substantially perpendicular to one another, and the edges of the indents are substantially sharp.

BRIEF SUMMARY OF THE INVENTION

From the foregoing, it is obvious that an improved gap-diode device for thermal-electric conversion is necessary having the simplicity of a layered structure to provide electrode separation without the use of active elements, in which problems of thermal expansion and parasitic heat loss are reduced or eliminated.

The present invention is directed towards a thermionic or thermotunneling generator or heat pump with an operating temperature of up to 500 degrees Celsius comprising electrodes having surfaces substantially facing one another, and which are separated by spacers disposed between the electrodes to provide a gap between the electrodes. The substrate material for the cathode is preferably a single crystalline silicon wafer while the substrate for the anode is an organic wafer, and preferably a polished polyimide (PI) wafer. On the cathode side, standard silicon wafer processes create the 10-1000 nm thin spacers and edge seals from thermally grown oxide. Either wafer is partially covered with a thin film of material that is characterized by high electrical conductivity and low work function. In one embodiment, the cathode is partially covered with a thin film of Ag—Cs—O, which is known as a good emitter, has a low work function, and is quite stable. In another embodiment, the anode can be covered with a thin film of Ag—Cs—O, provided that the work function of the cathode coating material is reduced further utilizing an Avto Metal structure (as discussed in a further aspect) to provide for the best performance in a power generator.

In a further aspect of the present invention, an Avto Metal pattern is created on the cathode surface by photo or e-beam lithography to further reduce the material's work function as described in US Patent Appl. Pub. No. 2006/0249796, and is then covered with a suitable metallic film.

In another aspect of the present invention, an Avto Metal pattern is created on the surface of the polished PI wafer through the use of nano-embossing or laser ablation techniques to further reduce the work function of the material while maintaining the smooth surface of a CMP polished substrate. Upon this textured surface the desired metallic films can be deposited by various methods known in the art, such as CVD, PVD, electroless deposition and others.

This invention sets and maintains a gap between the electrodes of a thermotunneling device without the use of active elements, and therefore problems of thermal conduction between its layers are reduced or eliminated.

A primary advantage of the present invention is the ability to individually optimize the required electrical, chemical and mechanical functions for each electrode.

This is especially advantageous in overcoming thermal stress related problems, being that by providing an organic material as a substrate for the anode, identical thermal expansion of both electrodes is created, even with a large temperature differential between the two.

Another advantage of the present invention is the reduction of parasitic heat losses by a factor of 100 or more when compared to silicon and up to a factor of 1000 when compared to a metal. At the same time, the thermal conductivity of organic wafers such as PI is still large enough to remove 10-100 W/cm2 heat at only 1-10° C. temperature gradient though the anode substrate from the regular operation of the device.

A further advantage of the present invention is reducing the cost of mass manufacturing by using standard methods known in the semiconductor industry. Costs are further reduced as the device does not require active elements such as piezoelectric actuators to create and maintain the gap. The reduction in manufacturing costs leads to an increase in possibilities for potential applications.

DETAILED DESCRIPTION OF THE INVENTION

Figure 1:
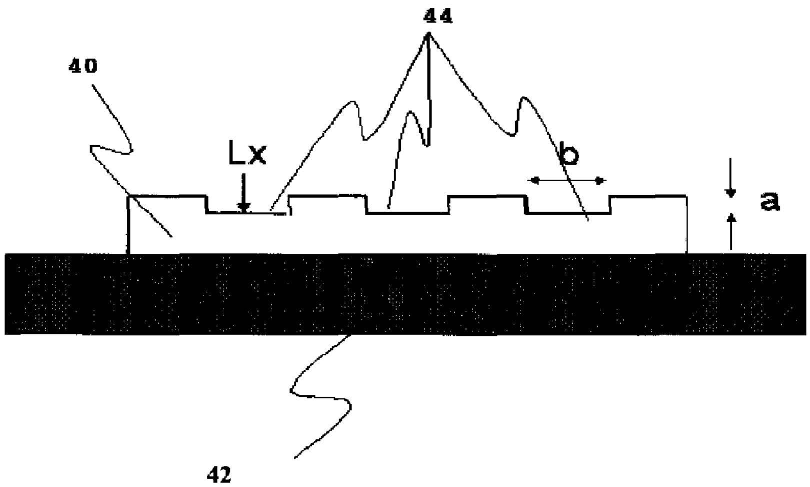
Figure 1 (Prior Art)
FIG. 1 shows a diagrammatic representation of a prior art metal film having a modified shape, which alters the electronic energy levels inside the modified electrode, leading to a decrease in electron work function.
Figure 2:
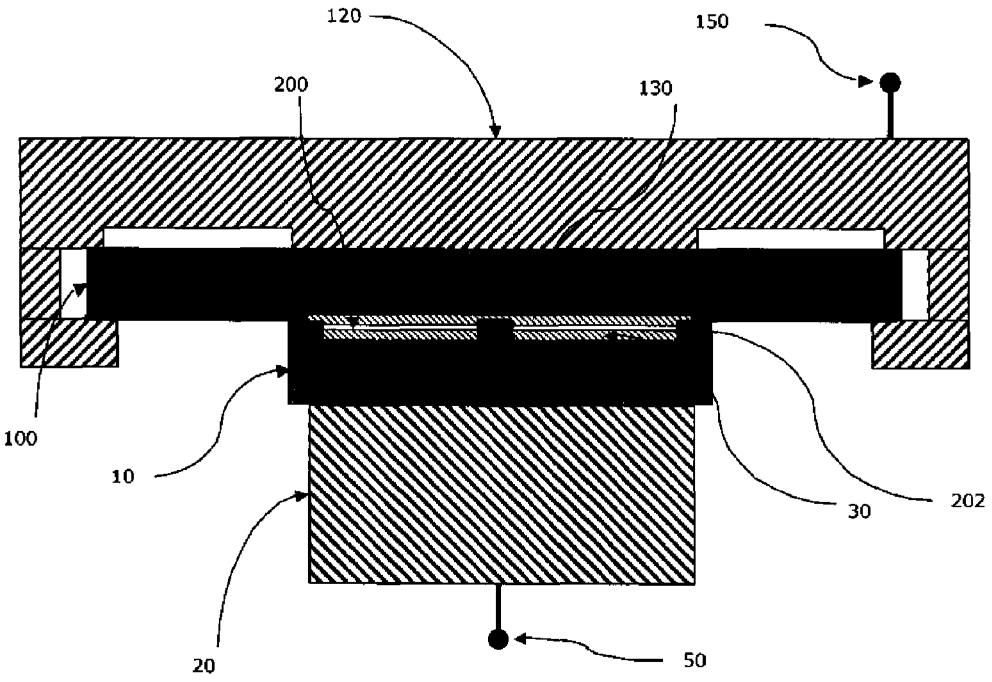
FIG. 2 shows a schematic of a compound material thermionic generator or heat pump of the present invention.

Embodiments of the present invention and their technical advantages may be better understood by referring to FIG. 2. FIG. 2 depicts a conceptual design of a compound material thermionic generator or heat pump of the present invention. Cathode 10 is preferably a single crystalline silicon wafer having an active cathode surface 30. Cathode surface 30 is a thin film of material characterized by high electrical conductivity and low work function. In a preferred embodiment, Ag—Cs—O is the material of cathode surface 30, having a low work function of ~1eV, good stability, and high electron emission. Cathode 10 is connected thermally and electrically to heat source 20 and terminal 50. Anode 100 is an organic wafer, preferably a polished polyimide (PI) wafer, partially covered by an active anode surface 130. In one embodiment, active anode surface 130 is comprised of a low work function and high electrically conducting material such as Ag—Cs—O, providing that its work function is reduced below the work function of the cathode in order to achieve high performance. Anode 100 is thermally connected to heat sink 120 and terminal 150. Active cathode surface 30 is separated from active anode surface 130 providing a vacuum gap 200 for thermal insulation. In a preferred embodiment, the separation is provided by spacers 202 created through standard silicon wafer processes such as those described in U.S. Pat. No. 6,876,123, and U.S. Patent Appl. Pub. No. 2007/0013055, which applications are incorporated herein by reference.

In a further embodiment, either or both of the electrodes have an active thin film of Ag—Cs—O. In such a case, the two wafers, cathode 10 and anode 100, are first joined together in conventional bonding equipment in an oxygen atmosphere, thereby enclosing a specific amount of oxygen in the gap. Additionally, one of cathode 10 and anode 100 has a small reservoir of cesium. During the bond anneal, when the edge seal material fuses to create an inseparable bond, the cesium evaporates, homogeneously covering both electrodes and reacting with the oxygen thereby creating low work function films and a high vacuum in the gap. Similar methods can be used for other active materials. In this embodiment, cathode 10 and anode 100 have an Avto Metal structure on their surfaces, thereby providing the difference in work function necessary for operation.

In a further refinement of the above method, the wafers are bonded in an oxygen/hydrogen atmosphere, wherein the hydrogen initially protects the metal surfaces from premature oxidation. During the bond anneal process, the hydrogen diffuses out and enables the controlled formation of the desired Cs—O surface coverage of both electrodes.

In a particularly preferred embodiment of the present invention, the surface of either or both substrate is modified through the use of patterned indents of Avto Metal texture to achieve the desired electronic and thermodynamic functions to provide for optimal performance in a power generator or heat pump. The modified surface provided by Avto Metals customizes the electronic energy levels inside the modified electrode, leading to a decrease in electron work function. The surface configuration comprises a substantially planar slab of a material having on one surface one or more indents of a depth approximately 5 to 20 times a roughness of said surface and a width approximately 5 to 15 times said depth. The walls of the indents are substantially perpendicular to one another, and the edges of the indents are substantially sharp. The depth of the indents is chosen so that the probability wave of the elementary particle reflected from the bottom of the indent interferes destructively with the probability wave of the elementary particle reflected from the surface. This results in the increase of tunneling through the potential barrier. When the elementary particle is an electron, electrons tunnel through the potential barrier, thereby leading to a reduction in the effective work function of the surface.

An Avto Metal pattern may be created on the cathode surface by photo or e-beam lithography as described in US Patent Appl. Pub. No. 2006/0249796, after which it is then covered with a suitable metallic film. To create an Avto Metal pattern on the surface of the polished PI wafer (anode), nano-embossing or laser ablation techniques may be used to further reduce the work function of the material while maintaining the smooth surface of a CMP polished substrate. Upon this textured surface the desired metallic films can be deposited by various methods known in the art, such as CVD, PVD, electroless depostition and others. It is known in the art that metallic films bond well to certain organic surfaces, among them PI.

Preferably, an identical degree of thermal expansion of said first and second electrodes is maintained while a temperature differential between said first and second electrodes exists.

Although particular embodiments of the invention have been described in detail for purposes of illustration, various modifications may be made without departing from the spirit and scope of the invention.

The invention claimed is:

1. A thermionic converter comprising a pair of nonmagnetic, nonflexible electrodes with surfaces substantially facing each other and separated by spacers disposed between facing surfaces to maintain a gap between the electrodes, wherein one of said pair of electrodes comprises a silicon wafer substrate processed to form a cathode and said spacers, the other of said pair of electrodes comprises an anode formed of an organic material wafer substrate, and the facing surface of each of said electrodes is an active surface comprising a thin film of a high electrical conductivity and a low work function material formed on each said substrate, wherein at least one of the cathode active surface or the anode active surface is modified to reduce electron work function and the electron work function of the anode active surface is reduced below the work function of the cathode active surface.

2. The converter of claim 1, wherein said cathode substrate is formed of a single crystalline silicon wafer and said spacers have a thinness of 10-1000 nm.

3. The converter of claim 1, wherein said anode substrate is formed of a polished polyimide wafer.

4. The converter of claim 1, wherein said modified active surface is comprised of a series of indents on the scale of the de Broglie wavelength.

5. The converter of claim 4, wherein the walls of said indents are substantially perpendicular to one another.

6. The converter of claim 4, wherein the walls of said indents are substantially sharp.

7. The converter of claim 4, wherein the depth of said indents is approximately 5 to 20 times a roughness of said surface.

8. The converter of claim 4, wherein the width of said indents is approximately 5 to 15 times said depth.

9. The converter of claim 4, wherein said modified active surface comprises an Avto Metal.

10. A method for building the converter of claim 4, comprising the steps of:

creating a pattern of nano-sized indents on a facing surface of either said cathode, said anode, said cathode and said anode, or neither said cathode or said anode, coating the facing surfaces of both of said cathode and said anode with a thin film of material comprising Ag—Cs—O characterized by high electrical conductivity and low work function so that the electron work function of the anode is reduced below the electron work function of the cathode, and joining said cathode and said anode such that the coated surfaces are substantially facing one another across said gap.

11. A heat pump comprising the converter of claim 4.

12. A power generator comprising the converter of claim 4.

13. The converter of claim 1, wherein said anode active surface comprises a thin film of material characterized by work function on the order of 1 eV.

14. The converter of claim 13, wherein said thin film of material is Ag—Cs—O.

15. The thermionic converter of claim 1, wherein the cathode and anode active surfaces comprise thin films of Ag—Cs—O with a work function of about 1 eV.

16. The thermionic converter of claim 1, wherein the anode substrate comprises an organic material selected to reduce parasitic heat losses during regular operation of said thermionic converter.

17. The thermionic converter of claim 1, comprising a thermionic or thermotunneling generator or heat pump with an operating temperature of up to 500° C., wherein the cathode is connected thermally to a heat source and the anode is connected to a heat sink, and the cathode active surface is separated from the anode active surface by a vacuum gap.

18. The thermionic converter of claim 1, wherein the anode organic wafer substrate comprises an organic material that creates a degree of thermal expansion identical to the thermal expansion of the cathode silicon substrate.

19. A method for building a thermionic converter, wherein said thermionic converter comprises a first electrode and a second electrode, and said first and second electrodes have surfaces substantially facing one another with a gap between said first and second electrodes, said method comprising the steps of:

a. providing a first electrode comprised of inorganic material having a modified surface;

b. providing a second electrode comprised of organic material having a modified surface, c. providing a small reservoir of cesium in either said first or said second electrode, d. joining said first and second electrodes in an oxygen-rich atmosphere, e. initiating the step of a bond anneal, whereby edge seal material fuses to create an inseparable bond, and f. providing for the evaporation of said cesium to homogeneously cover said first and said second electrode and further react with said oxygen thereby creating low work function films on said first and second electrodes and a high vacuum in said gap.

20. The method of claim 19, wherein said oxygen-rich atmosphere additionally comprises hydrogen, wherein said hydrogen protects said metal films from oxidation, and wherein during said step initiating bond annealing creating an inseparable bond, said hydrogen diffuses out.

* * * * *